United States Patent
Barnes

(10) Patent No.: US 11,138,128 B2
(45) Date of Patent: Oct. 5, 2021

(54) CONTROLLING GUARD TAG CHECKING IN MEMORY ACCESSES

(71) Applicant: ARM LIMITED, Cambridge (GB)

(72) Inventor: Graeme Peter Barnes, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 16/647,661

(22) PCT Filed: Jan. 25, 2019

(86) PCT No.: PCT/GB2019/050210
§ 371 (c)(1),
(2) Date: Mar. 16, 2020

(87) PCT Pub. No.: WO2019/150081
PCT Pub. Date: Aug. 8, 2019

(65) Prior Publication Data
US 2020/0272575 A1 Aug. 27, 2020

(30) Foreign Application Priority Data
Feb. 2, 2018 (GB) ...................................... 1801748

(51) Int. Cl.
*G06F 12/1009* (2016.01)
(52) U.S. Cl.
CPC .... *G06F 12/1009* (2013.01); *G06F 2212/657* (2013.01)
(58) Field of Classification Search
CPC ........... G06F 12/1009; G06F 2212/657; G06F 2212/1024; G06F 2212/1052; G06F 12/1475; G06F 12/1027; G06F 12/1441
See application file for complete search history.

(56) References Cited

U.S. PATENT DOCUMENTS

2007/0157003 A1* 7/2007 Durham .............. G06F 12/1491
711/206
2008/0140968 A1 6/2008 Doshi et al.
(Continued)

OTHER PUBLICATIONS

International Search Report and Written Opinion of the ISA for PCT/GB2019/050210, dated Apr. 25, 2019, 16 pages.
(Continued)

*Primary Examiner* — Sean D Rossiter
(74) *Attorney, Agent, or Firm* — Nixon & Vanderhye P.C.

(57) ABSTRACT

An apparatus comprises address translation circuitry to perform a translation of virtual addresses into physical addresses in dependence on stored page table mappings between the virtual addresses and the physical addresses. The stored page table mappings comprise tag-guard control information. The apparatus comprises memory access circuitry to perform a tag-guarded memory access in response to a target physical address, the tag-guarded memory access comprising a guard-tag check of comparing an address tag associated with the target physical address with a guard tag stored in association with a block of one or more memory locations comprising an addressed location identified by the target physical address. The memory access circuitry is arranged to perform a non-tag-guarded memory access to the addressed location in response to the target physical address without performing the guard-tag check in dependence on the tag-guard control information.

9 Claims, 8 Drawing Sheets

(56) References Cited

U.S. PATENT DOCUMENTS

| | | | |
|---|---|---|---|
| 2012/0296877 A1 | 11/2012 | Guthrie et al. | |
| 2016/0371179 A1* | 12/2016 | Stark | G06F 11/1076 |
| 2017/0177429 A1* | 6/2017 | Stark | G06F 11/073 |
| 2020/0272575 A1* | 8/2020 | Barnes | G06F 12/1475 |
| 2021/0019268 A1* | 1/2021 | Barnes | G06F 21/52 |

OTHER PUBLICATIONS

Combined Search and Examination Report for GB1801748.3, dated Jul. 24, 2018, 7 pages.
Gumpertz, "Error Detection with Memory Tags", Dec. 1981, *Dissertations*, Paper 533, 119 pages.
Watson et al., "Capability Hardware Enhanced RISC Instructions: CHERI Instruction Set Architecture" (version 6), Technical Report, University of Cambridge, Apr. 2017, ISSN 1476-2986, 10 pages.
Watson et al., "Capability Hardware Enhanced RISC Instructions: CHERI Instruction Set Architecture" (version 6), Technical Report, University of Cambridge, Apr. 2017, ISSN 1476-2986, 9 pages.
Watson et al., "Capability Hardware Enhanced RISC Instructions: CHERI Instruction Set Architecture" (version 6), Technical Report, University of Cambridge, Apr. 2017, ISSN 1476-2986, 307 pages.

\* cited by examiner

CONTROLLING GUARD TAG CHECKING IN MEMORY ACCESSES

This application is the U.S. national phase of International Application No. PCT/GB2019/050210 filed 25 Jan. 2019, which designated the U.S. and claims priority to GB Patent Application No. 1801748.3 filed 2 Feb. 2018, the entire contents of each of which are hereby incorporated by reference.

The present technique relates to the field of data processing.

Software to be executed by a data processing apparatus may typically be written in a high-level programming language and then compiled into code according to the instruction set architecture supported by the apparatus on which the software is to be executed. For example, the software may originally be written in a higher level language such as Java, C or C++, and then compiled into a natively supported instruction set architecture such as x86 or Arm®.

Some higher level programming languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled code according to a given instruction set architecture, there may be a large number of memory related errors which may be vulnerable to exploitation by an attacker or other malicious party. Such errors may include:

Bounds violations, in which an array index supplied by the code is outside the legitimate bounds of the array;

Use-after-free errors, in which an access to a memory location is made after that memory location has already been deallocated or freed;

Use-after-return, in which a memory access to an address associated with a variable used within a function (such as a value on a stack) is made after already returning from the function;

Use-out-of-scope errors, in which variables are accessed outside of the scope in which they are declared; and Use-before-initialisation errors, in which a memory address associated with a variable is accessed before the variable has been initialised.

These are just some examples of memory-related errors which can result in unpredictable behaviour and potentially provide avenues for attackers to exploit and hence it may be desirable to provide architectural support, within the instruction set architecture supported by a given processing apparatus, for assisting with runtime detection of certain classes of memory errors.

At least some examples provide an apparatus comprising:
address translation circuitry to perform a translation of virtual addresses into physical addresses in dependence on stored page table mappings between the virtual addresses and the physical addresses, wherein the stored page table mappings comprise tag-guard control information; and
memory access circuitry to perform a tag-guarded memory access in response to a target physical address, the tag-guarded memory access comprising a guard-tag check of comparing an address tag associated with the target physical address with a guard tag stored in association with a block of one or more memory locations comprising an addressed location identified by the target physical address,
wherein the memory access circuitry is arranged to perform a non-tag-guarded memory access to the addressed location in response to the target physical address without performing the guard-tag check in dependence on the tag-guard control information.

At least some examples provide a method comprising:
performing a translation of virtual addresses into physical addresses in dependence on stored page table mappings between the virtual addresses and the physical addresses, wherein the stored page table mappings comprise tag-guard control information; and
in dependence on the tag-guard control information, performing one of:
a tag-guarded memory access in response to a target physical address, the tag-guarded memory access comprising a guard-tag check of comparing an address tag associated with the target physical address with a guard tag stored in association with a block of one or more memory locations comprising an addressed location identified by the target physical address; and
a non-tag-guarded memory access to the addressed location without performing the guard-tag check in response to the target physical address.

At least some examples provide a computer program for controlling a host data processing apparatus to provide an instruction execution environment for execution of instructions of target program code, comprising:
address translation program logic to perform a translation of virtual addresses into physical addresses in dependence on stored page table mappings between the virtual addresses and the physical addresses, wherein the stored page table mappings comprise tag-guard control information; and
memory access program logic to perform a tag-guarded memory access in response to a target physical address, the tag-guarded memory access comprising a guard-tag check of comparing an address tag associated with the target physical address with a guard tag stored in association with a block of one or more memory locations comprising an addressed location identified by the target physical address,
wherein the memory access program logic is arranged to perform a non-tag-guarded memory access to the addressed location in response to the target physical address without performing the without performing the guard-tag check in dependence on the tag-guard control information.

A storage medium may store the computer program described above. The storage medium may be a non-transitory storage medium.

BRIEF DESCRIPTION OF THE DRAWINGS

The present techniques will be described further, by way of example only, with reference to embodiments thereof as illustrated in the accompanying drawings, in which.

Figure 1:
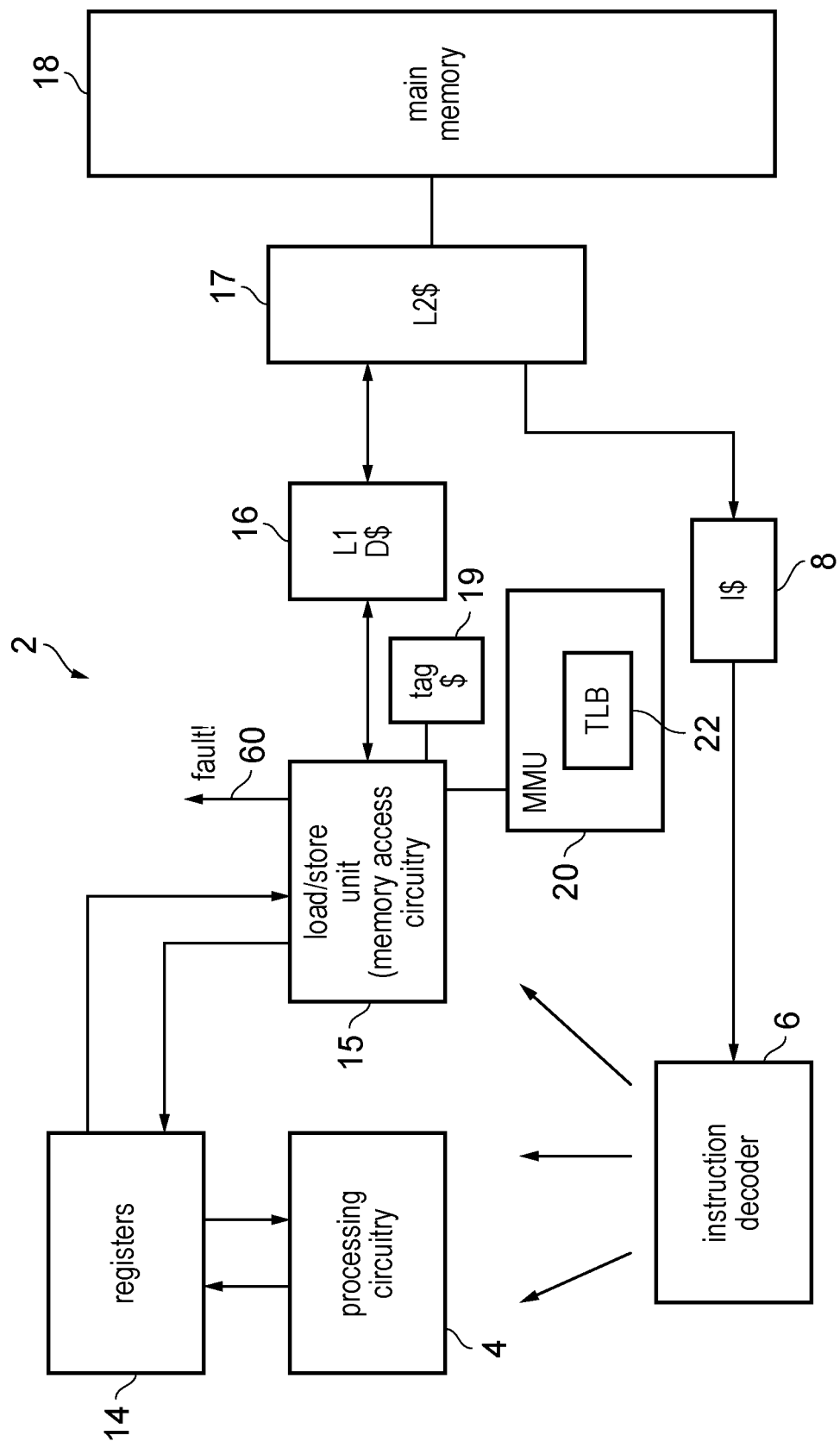
FIG. 1 schematically illustrates an example of a data processing apparatus.

At least some embodiments provide an apparatus comprising:

address translation circuitry to perform a translation of virtual addresses into physical addresses in dependence on stored page table mappings between the virtual addresses and the physical addresses, wherein the stored page table mappings comprise tag-guard control information; and memory access circuitry to perform a tag-guarded memory access in response to a target physical address, the tag-guarded memory access comprising a guard-tag check of comparing an address tag associated with the target physical address with a guard tag stored in association with a block of one or more memory locations comprising an addressed location identified by the target physical address, wherein the memory access circuitry is arranged to perform a non-tag-guarded memory access to the addressed location in response to the target physical address without performing the guard-tag check in dependence on the tag-guard control information.

One approach for protecting against certain memory usage errors of the type discussed above may be to provide guard tags which are stored in a memory system in association with blocks of one or more memory locations. When a tag-guarded memory access is requested based on a target address identifying a particular addressed location in the memory system, memory access circuitry may compare an address tag that is associated with the target address with a guard tag that is stored in the memory system in associated with a block of one or more memory locations which includes the addressed location identified by the target address. The memory access circuitry may generate an indication of whether a match is detected between the guard tag and the address tag. This indication can be used to control whether the memory access is allowed to succeed or whether subsequent operations can succeed, or could merely be reported while allowing memory accesses to continue as normal.

This can be useful as, for example, a compiler compiling code based on a memory-unsafe language such as C or C++ can, when initialising regions of memory, set the guard tags of blocks of memory which the code is expected to access to particular values, and may associate the corresponding address tag values with the target addresses pointing to those blocks. If a memory usage error occurs, and for example the address pointer is used out of scope or extends out of the bounds of the valid range which was initialised, then it may be likely that the guard tag associated with the addressed location may not match the address tag associated with the target address, and then in this case the indication of whether a match is detected can be used to trigger some error handling response or error reporting mechanism. The particular response taken can depend on the particular needs of the software being executed or on the particular microarchitectural implementation of the architecture. Hence, even if the high level language does not have means for performing run time error checks in order to guard against memory access errors, the ISA used for the compiled code may include architectural features for performing such checks.

However, the checking of such guard tags may incur some overhead in performing the guard tag checking that may be less desirable in some contexts. The apparatus discussed here, when performing virtual to physical address translations, makes use of page table mappings which comprise tag-guard control information and memory access circuitry then either performs perform a tag-guarded memory access (doing the guard tag checking) or simply performs a "normal" memory access (without doing the guard tag checking) in dependence on the tag-guard control information. This thus allows control over whether the guard tag checking is performed to be made in dependence on the (physical) address which is the subject of the memory access, since the tag-guard control information forms part of the page table mapping defined for that (physical) address. Memory addresses can be variously categorised (e.g. by owner, by content, and so on) allowing a versatile control over when which memory accesses are accompanied by the guard tag checking.

The tag-guard control information may take a variety of forms but in some examples the stored page table mappings comprise a tag-guard control bit for each page table entry and the memory access circuitry is responsive to the tag-guard control bit having a predetermined first value to perform the tag-guarded memory access to the addressed location and the memory access circuitry is responsive to the tag-guard control bit having a predetermined second value to perform the non-tag-guarded memory access to the addressed location. Hence a single bit can control whether any access made to the addressed location is accompanied by the guard tag checking.

In some examples the stored page table mappings comprise plural tag-guard control bits for each page table entry and the memory access circuitry is responsive to at least one of the plural tag-guard control bits having a predetermined first value to perform the tag-guarded memory access to the addressed location and the memory access circuitry is responsive to the tag-guard control bit having a predetermined second value to perform the non-tag-guarded memory access to the addressed location. Hence where the tag-guard control information comprises multiple bits a more fine-grained control over which accesses to the addressed location are accompanied by the guard tag checking is supported. Any definable characteristic of a memory access may then be made use of in determining whether the guard tag checking happens or not.

In some examples the plural tag-guard control bits for each page table entry specify tag-check rules dependent on a type of the memory access. Thus whether the guard tag checking happens or not can depend on the memory access type. For example guard tag checking could be dispensed with for all but one specific type of memory access, could be triggered for all but one specific type of memory access, or anything in between these extremes.

In some examples the plural tag-guard control bits for each page table entry define tag-check rules arranged to be applied to at least one of: data accesses to the addressed location; instruction fetches to the addressed location; and data accesses made using instructions fetched from the addressed location.

In some examples the plural tag-guard control bits for each page table entry define tag-check rules which differ for a load operation and for a store operation. A particular distinction which may be useful to make is between loads and stores, such that the guard tag checking happens for one but not the other.

In some examples the plural tag-guard control bits for each page table entry define a tag-check rule specifying the non-tag-guarded memory access operation for a write access to the addressed location. Hence writes to the address location can be made without the guard tag checking happening.

When addressed location is allocated, before being accessed, the tag-guard control information may be variously set in dependence on the intended use of that addressed location. In some examples the apparatus is arranged to set the tag-guard control information in the stored page table mappings in dependence on whether the addressed location is allocated for instruction or data storage. It may be configured that the guard tag checking happens for one but not the other.

Further, the owner of the allocated memory location may be used to determine whether the guard tag checking happens and in some examples the apparatus is arranged to set the tag-guard control information in the stored page table mappings in dependence on whether the addressed location is allocated as kernel space or as user space.

At least some embodiments provide a method comprising: performing a translation of virtual addresses into physical addresses in dependence on stored page table mappings between the virtual addresses and the physical addresses, wherein the stored page table mappings comprise tag-guard control information; and in dependence on the tag-guard control information, performing one of:

a tag-guarded memory access in response to a target physical address, the tag-guarded memory access comprising a guard-tag check of comparing an address tag associated with the target physical address with a guard tag stored in association with a block of one or more memory locations comprising an addressed location identified by the target physical address; and a non-tag-guarded memory access to the addressed location without performing the guard-tag check in response to the target physical address.

At least some embodiments provide an a computer program for controlling a host data processing apparatus to provide an instruction execution environment for execution of instructions of target program code, comprising:

address translation program logic to perform a translation of virtual addresses into physical addresses in dependence on stored page table mappings between the virtual addresses and the physical addresses, wherein the stored page table mappings comprise tag-guard control information; and memory access program logic to perform a tag-guarded memory access in response to a target physical address, the tag-guarded memory access comprising a guard-tag check of comparing an address tag associated with the target physical address with a guard tag stored in association with a block of one or more memory locations comprising an addressed location identified by the target physical address, wherein the memory access program logic is arranged to perform a non-tag-guarded memory access to the addressed location in response to the target physical address without performing the without performing the guard-tag check in dependence on the tag-guard control information.

At least some embodiments provide a storage medium storing the above described computer program.

Some particular embodiments are now described with reference to the figures.

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals 10 for controlling the processing circuitry 4 to perform corresponding processing operations represented by the instructions. The processing circuitry 4 may include one or more execution units for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes memory access circuitry (e.g. including a load/store unit) 15 for controlling transfer of data between the registers 14 and the memory system. In this example, the memory system includes the instruction cache 8, a level 1 (L1) data cache 16, a level 2 (L2) cache 17 shared between data and instructions, and main memory 18. It will be appreciated that other cache hierarchies are also possible—this is just one example. A memory management unit (MMU) 20 is provided for providing address translation functionality to support memory accesses triggered by the load/store unit 15. The MMU has a translation lookaside buffer (TLB) 22 for caching a subset of entries from page tables stored in the memory system 16, 17, 18. Each page table entry may provide an address translation mapping for a corresponding page of addresses and may also specify access control parameters, such as access permissions specifying whether the page is a read only region or is both readable and writable, or access permissions specifying which privilege levels can access the page. Further, as discussed in more detail below, a page table entry can specify tag-guard control information which is used by the present technique to control whether guard tag checking happens when access is made to an address within that page of addresses.

Figure 2:
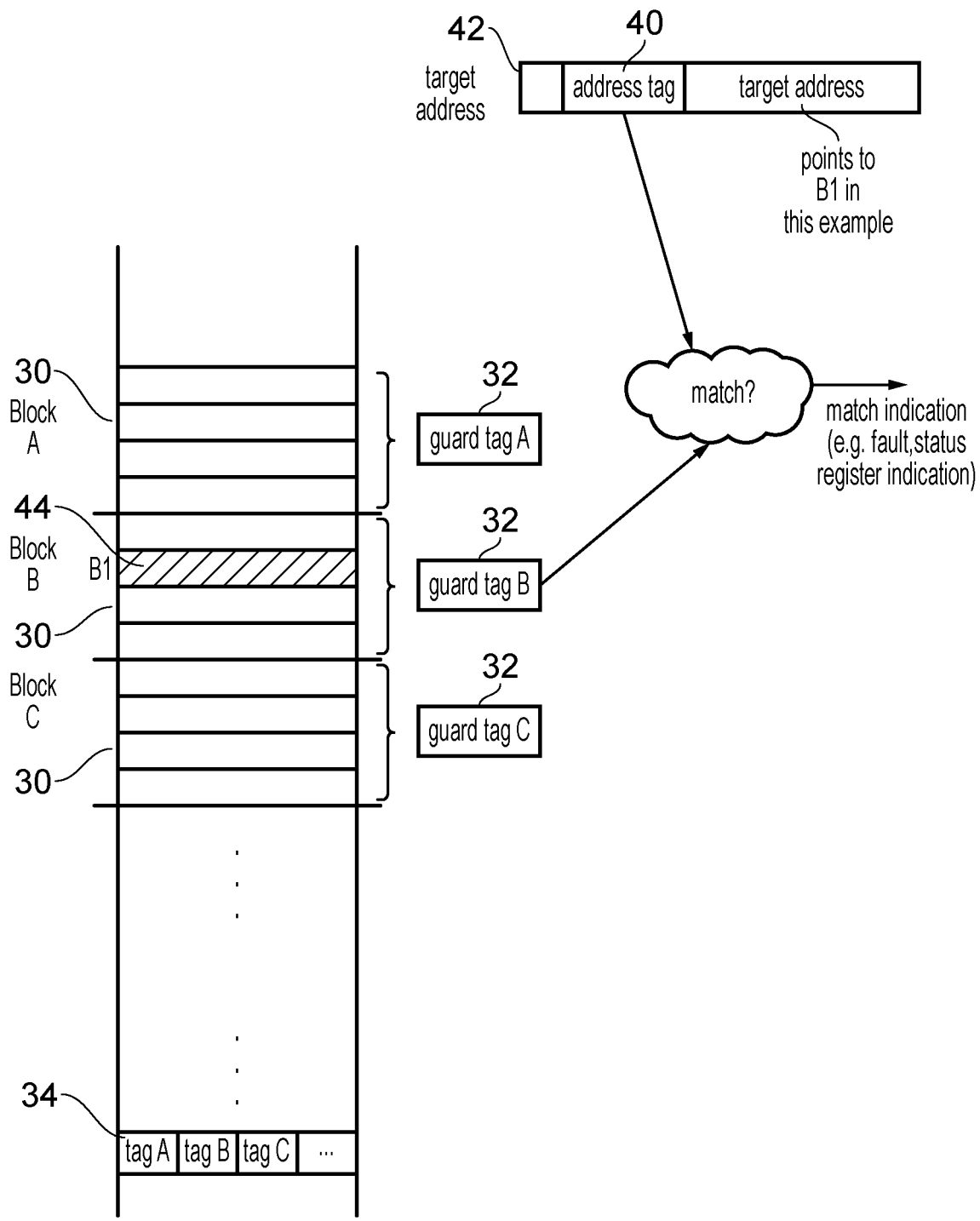
FIG. 2 shows an example of a tag-guarded memory access operation comprising checking whether an address tag matches a guard tag.

FIG. 2 schematically illustrates a concept of tag-guarded memory accesses. The physical address space used to refer to memory locations within the memory system may be logically partitioned into a number of blocks 30 each comprising a certain number of addressable locations. For conciseness, in the example of FIG. 2, each block 30 comprises four memory locations, but other block sizes could be used as well. Each block 30 is associated with a corresponding guard tag 32. The guard tags associated with a certain number of blocks 30 can be gathered together and stored either within a different architecturally accessible memory location 34 within the physical address space, or within additional storage locations provided in main memory 18, which are not architecturally accessible (not mapped to the same physical address space). The use of separate non-architecturally accessible storage may in some cases be preferred to avoid using up space in the data caches 16, 17 for caching guard tag values, which could impact on the performance of the regular code and could make coherency management more complex. An additional tag cache 19 could be provided in the micro-architecture for caching tag values from the non-architecturally accessible storage, for faster access than if the tags had to be accessed from main memory 18. The particular mapping of which tag storage locations 34 correspond to each block 30 may be controlled by the load/store unit 15 and could be hardwired or could be programmable. While in FIG. 2 each tag 32 is associated with a block of physical addresses, it would also be possible to provide guard tags 32 associated with virtual memory locations in a virtual memory address space, but this may require some additional address translations on each memory access. Hence by associating the guard tag 32 with physical memory locations this can improve performance. In general it is a choice for the particular micro-architectural implementation exactly how the guard tags 32 are associated with the corresponding blocks 30 of the physical address space. In general, all that is required is that the guard tag 32 associated with a given block of memory can be accessed and compared.

Hence, when a tag-guarded memory access is required to happen, an address tag 40 (which is associated with the target address 42 identifying the addressed location 44 to be accessed), can be compared against the guard tag 32 which is associated with the block of memory locations 30 which includes the addressed location 44. For example, in FIG. 2 the target address 42 points to a certain location B1 in memory, marked 44 in the address space of FIG. 2. Therefore the guard tag B which is associated with the block of locations B including location B1 is compared against the address tag 40 associated with a target address 42. As shown in the top of FIG. 2, the address tag 4 may be determined as a function of selected bits of the target address itself. In particular, the address tag may be determined from bits within a portion of the target address which is unused for indicating the specific memory location which is to be selected as the addressed location 44. For example, in some architectures the top portion of bits of the target address may always have a certain fixed value such as a sign extension (all 0s or all 1s) and so an address can be tagged with the address tag 40 by overwriting these unused bits with an arbitrary tag value. The particular address tag value can be selected by a programmer or compiler, for example. The address tag and guard tag 32 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed, a comparison is made between the address tag 40 and the guard tag 32 associated with a block 30 including the addressed location 44, and a determination as to whether they match. It should be noted that in the example configuration of FIG. 1 the comparison could be performed anywhere between the load/store unit 15 and the physical memory 18 (and indeed could be distributed along that path). However in this example, the comparison is described for simplicity in terms of it being carried out by the load/store unit 15. The load/store unit 15 generates a match indication indicating whether the address tag 40 and the guard tag 32 matched. For example, this match indication could be a fault signal 60, which is generated if there is a mismatch between the address tag 40 and the guard tag 32, or an indication placed in a status register indicating whether there was a match, or an entry added to an error report to indicate the address for which the error was detected and/or the instruction address of the instruction which triggered the error.

Figure 3:
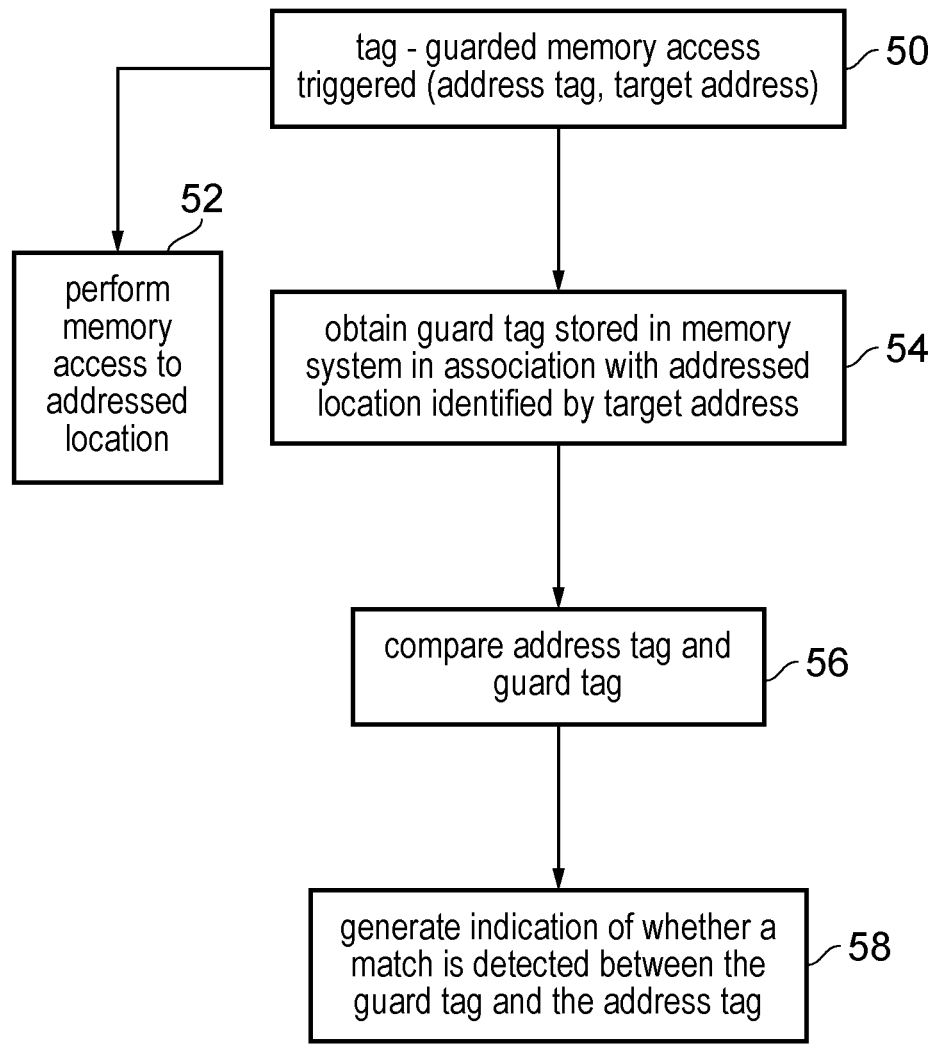
FIG. 3 is a flow diagram showing a method of performing a tag-guarded memory access operation.

FIG. 3 shows a flow diagram for handling a tag guarded memory access. The instruction triggering the memory access may specify an address tag and a target address. As shown in FIG. 2, in some cases the address tag may actually be derived from a subset of bits of the target address itself, although in other examples it could be specified in a separate register. At step 50, the instruction triggering the tag guarded memory accesses is encountered. In response, at step 52 the memory access circuitry 15 triggers a memory access to the addressed location 44 identified by the target address. Also, at step 54 the memory access circuitry 15 obtains the guard tag 32 which is stored in the memory system in association with the block of memory locations 30 that includes the addressed location 44 identified by the target address. At step 56 the memory access circuitry 15 compares the address tag 40 with the guard tag 32 obtained at step 54. At step 58 an indication of whether a match is detected between the guard tag and the address tag is generated by the memory access circuitry 15 (e.g. any of the types of match/mismatch reporting indication described above). The precise indication used to report any mismatch may vary from implementation to implementation.

Figure 4:
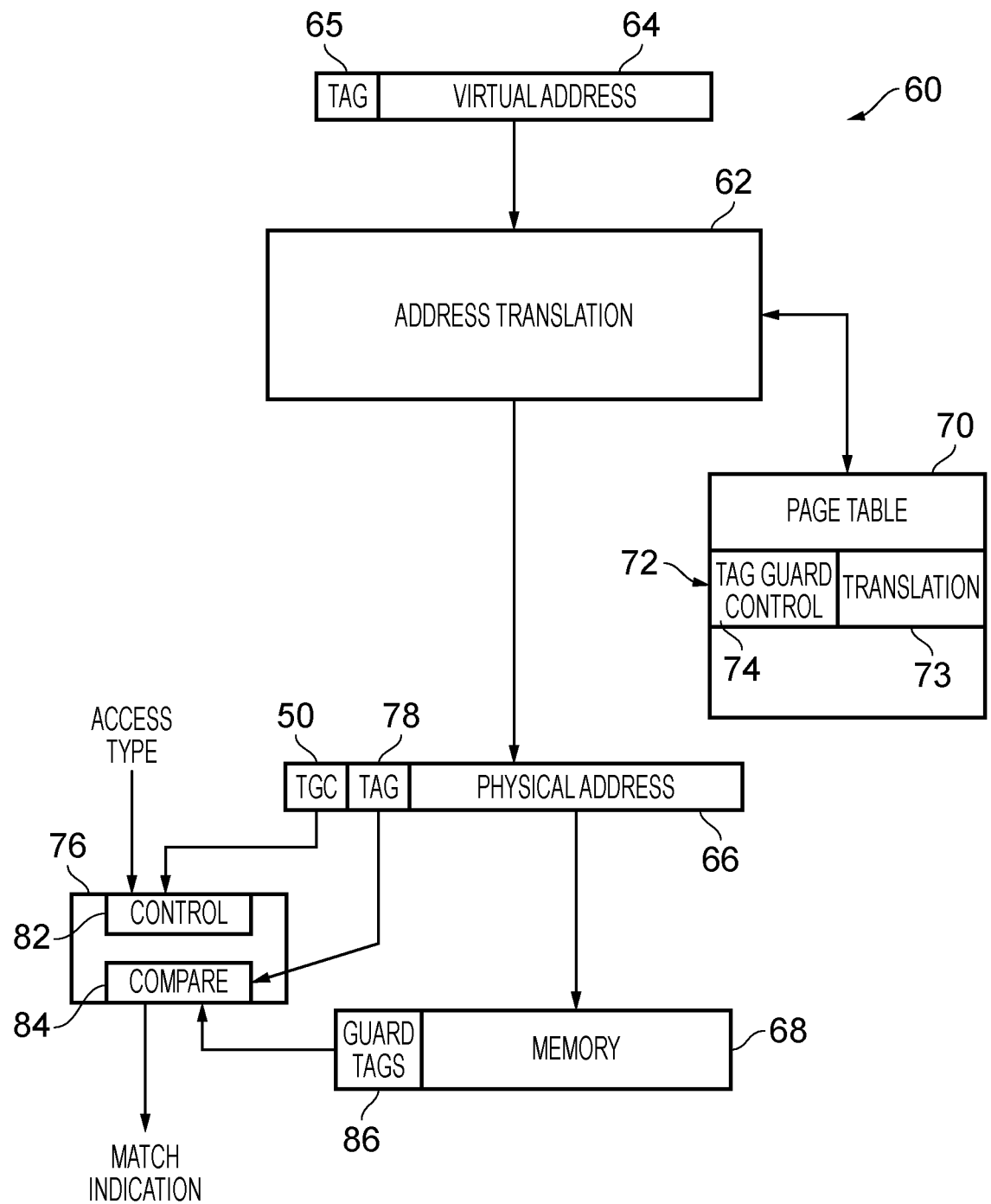
FIG. 4 schematically illustrates an example system in which address translation and guard tag checking can be carried out.

FIG. 4 schematically illustrates a representation of apparatus 60 in one example. Address translation circuitry 62, which may be part of the MMU 20 receives a virtual address (comprising a tag portion 65). The address translation circuitry 62 translates the virtual address 64 into a physical address 66 for use in the memory system. Memory 68 is generically shown in FIG. 4, which may comprise main memory and one or more caches. The address translation circuitry 62 performs the translations with reference to page tables, of which a single example 70 is shown (and which in fact is stored in the memory system). As mentioned above an MMU may have a TLB to cache frequently used translations. A page table entry 72 comprises the translation information itself as well as additional tag guard control information 74. I performing the translation the address translation circuitry 62 incorporates the tag guard control information into the physical address it generates. This can for example be a portion of the address space (also referred to here as a physical tag) which is not used to specify a physical memory location, but instead is used to convey other information to the memory system. For example in a 64-bit address space it may be the case that bits [55:0] form the virtual address portion and bits [63:56] form the virtual tag portion. Similarly in the physical addresses bits [55:0] may form the physical address portion and bits [63:56] form the physical tag portion. Whatever its defined bit-space, this physical tag portion can convey chosen information to the memory system for example an address tag that may be compared against a guard tag, but this may not occupy all of the physical tag portion, and the tag guard control information 74 can thus also be conveyed.

Tag guard checking circuitry 76 receives both the address tag 78 and the tag guard control information (TGC) 80 (now part of the physical address 66). A control unit 82 in the tag guard checking circuitry 76 receives the tag guard control information (TGC) 80 and depending on the particular information received, the control unit determines whether the guard tag checking is carried out. It is the compare unit 84 in the tag guard checking circuitry 76 which carries out the checking, by receiving the address tag 78 and the relevant guard tag 86 stored in association with the addressed location. FIG. 4 shows that the control unit 82 also receives an indication of the type of memory access (e.g. load or store, i.e. read or write), and the control unit may in some examples be arranged to take that into account when it determines whether the guard tag checking is carried out.

Figure 5A:
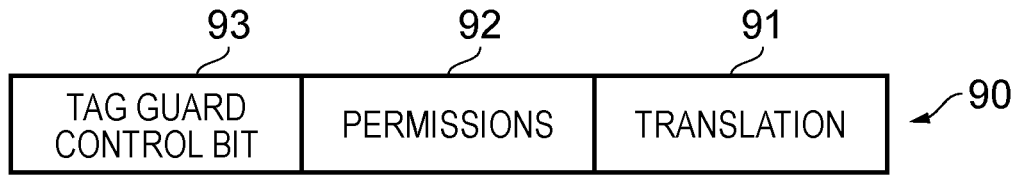
FIGS. 5A, 5B, and 5C show example page table entries comprising tag-guard control information.
Figure 5B:
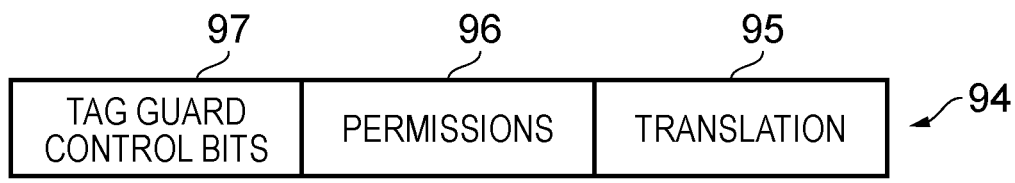
Figure 5C:
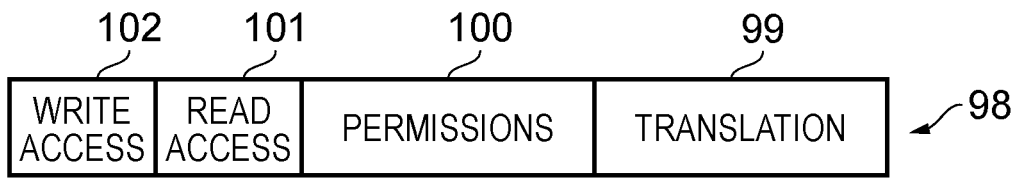

FIGS. 5A, 5B, and 5C show example page table entries comprising tag-guard control information. The page table entry 90 in FIG. 5A comprises the translation information 91 itself, as well as various permission information 92, and a single tag guard control bit 93. Hence for a physical address generated using the page table entry 90, the guard tag checking can only be switched fully off or fully on. The page table entry 94 in FIG. 5B comprises the translation information 95 itself, as well as various permission information 96, and a set of tag guard control bits 97. Hence for a physical address generated using the page table entry 97, the guard tag checking can be variously controlled, in dependence on the meaning associated with each of the set of tag guard control bits 97. The page table entry 98 in FIG. 5C gives one example of plural tag guard control bits being settable in a page table entry and comprises the translation information 99 itself, as well as various permission information 100. It further comprises tag guard control for read accesses 101 and tag guard control for write accesses 102. These may be just one bit each, such that guard tag checking can be switched fully off or fully on for each type of access. However here too plural bits are conceivable for each, such that greater control can be exerted over whether guard tag checking is performed for each type of access, depending on a further defined contextual constraint. For example in some the plural bits define bespoke tag-check rules: for data accesses to the addressed location, for instruction fetches to the addressed location, and for data accesses made using instructions fetched from the addressed location. For each of these contexts the guard tag checking can be switched on or off depending on the system requirements.

Figure 6:
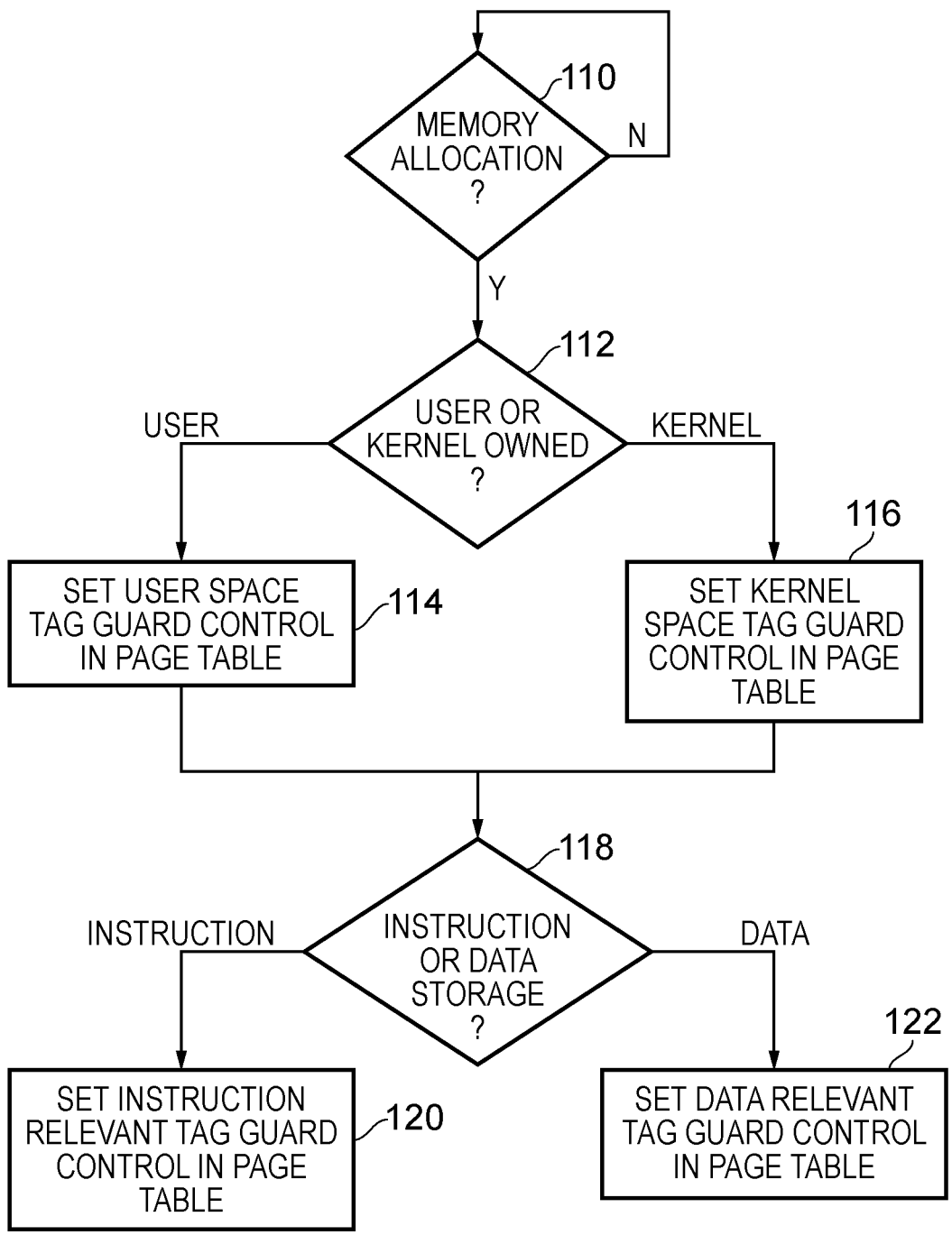
FIG. 6 is a flow diagram showing how page table bits are set when memory is allocated in one example.

FIG. 6 is a flow diagram showing how page table bits are set when memory is allocated in one example. The flow starts at step 110, where the process waits until memory allocation is required. When it is, at step 112 it is determined if the allocation is for a user process or a kernel process. For a user process the flow goes to step 114, where the desired tag guard checking configuration (e.g. by any of the examples of FIGS. 5A-C) is set in the corresponding page table entry or entries. For a kernel process the flow goes to step 116, where the desired tag guard checking configuration (e.g. by any of the examples of FIGS. 5A-C) is set in the corresponding page table entry or entries. To name just one example, tag guard checking may be switched on for the user space allocation, but turned off for the kernel space allocation. As an aside here note that since this happens via the page table entry for each, and a given physical address may be accessed corresponding to two different virtual address (one for a user space allocation, one for a kernel space allocation), tag guard checking for the same physical location/guard tag can be configured to happen for one access (e.g. user), but not the other (kernel). By either route the flow then reaches step 118, where it is determined if the allocation is for instruction or data storage, and distinct tag guard control configurations may be set for each (at steps 120 and 122 respectively). It should be appreciated that FIG. 6 shows just one example process and it is not required, for example for both the user/kernel and the instruction/data distinction to be made. Just one of these may be used in some examples.

Figure 7:
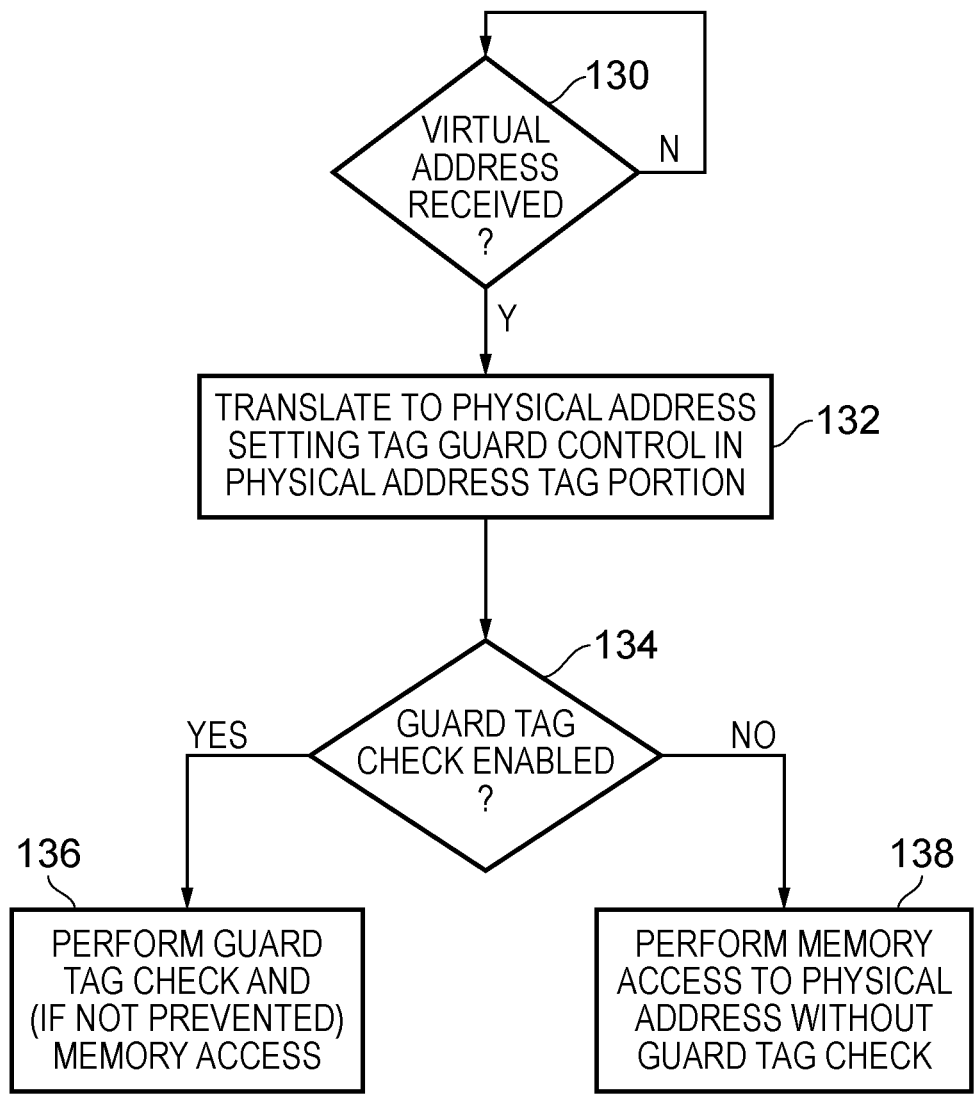
FIG. 7 is a flow diagram showing control over guard tag checking being exerted in dependence on tag-guard control information in a page table entry in one example.

FIG. 7 is a flow diagram showing control over guard tag checking being exerted in dependence on tag-guard control information in a page table entry in one example. The flow starts at step 130, where the process waits until a virtual address is received. When it is, at step 132, the virtual address is translate into a physical address, in which tag guard control information from the page table entry is included in the physical tag portion of the physical address. Then at step 134, when the physical address is to be accessed in the memory system, it is determined if guard tag checking is enabled (as defined by the tag guard control information and possibly with reference to other contextual information, such as the access type). When it is then the guard tag check is performed at step 136, and (if not prevented, as this is one possible, but not mandatory, outcome of a guard tag check fail) the memory access to the location addressed by the physical address. Otherwise at step 138 the memory access to the location addressed by the physical address is carried out without the guard tag check being performed.

Figure 8:
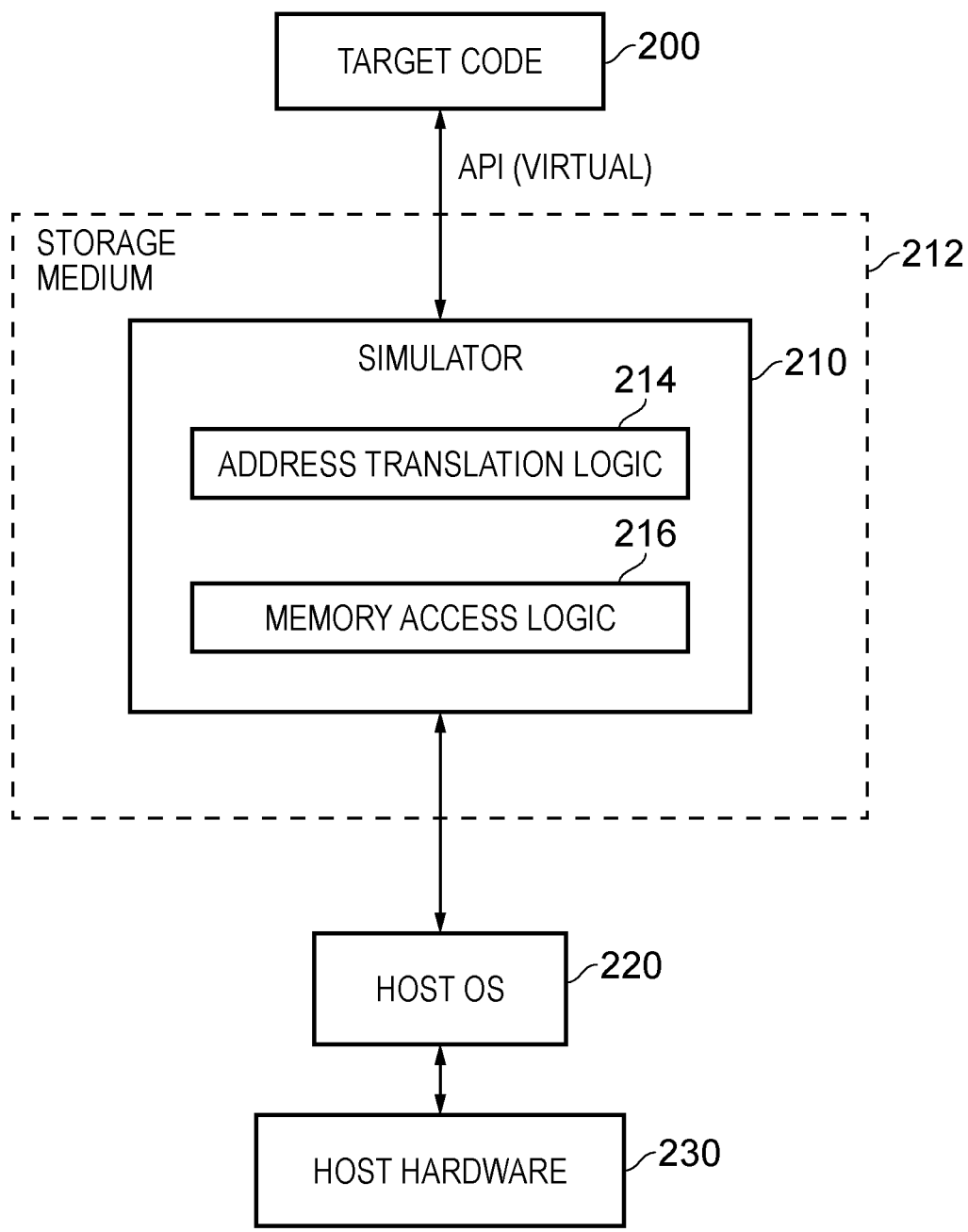
FIG. 8 shows an example of a simulator supporting address translation logic.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium 212 (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200 may be executed from within the instruction execution environment using the simulator program 210, so that a host computer 230 which does not actually have the hardware features of the apparatus 60 discussed above, and in particular the address translation circuitry 62 and the tag guard checking circuitry 76, can emulate these features. For example, the simulator program 210 may include address translation logic 214 for translating virtual addresses into physical addresses and may include memory access logic 216 for accessing addressed locations and for carrying out guard tag checking. Thus the simulator program 210 may also include memory access program logic 216 for performing the comparison of a guard tag and an address tag and reporting whether any mismatch between the guard tag and the address tag has been detected. Also, the simulator program 210 may include page table setting program logic, which comprises instructions for setting the page table entries in a corresponding way to the way in which a hardware embodiment would set them.

In brief overall summary, an apparatus comprises address translation circuitry to perform a translation of virtual addresses into physical addresses in dependence on stored page table mappings between the virtual addresses and the physical addresses. The stored page table mappings comprise tag-guard control information. The apparatus comprises memory access circuitry to perform a tag-guarded memory access in response to a target physical address, the tag-guarded memory access comprising a guard-tag check of comparing an address tag associated with the target physical address with a guard tag stored in association with a block of one or more memory locations comprising an addressed location identified by the target physical address. The memory access circuitry is arranged to perform a non-tag-guarded memory access to the addressed location in response to the target physical address without performing the guard-tag check in dependence on the tag-guard control information.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
   address translation circuitry to perform a translation of virtual addresses into physical addresses in dependence on stored page table mappings between the virtual addresses and the physical addresses, wherein the stored page table mappings comprise tag-guard control information; and
   memory access circuitry to perform a tag-guarded memory access in response to a target physical address, the tag-guarded memory access comprising a guard-tag check of comparing an address tag associated with the target physical address with a guard tag stored in association with a block of one or more memory locations comprising an addressed location identified by the target physical address,
   wherein the memory access circuitry is arranged to perform a non-tag-guarded memory access to the addressed location in response to the target physical address without performing the guard-tag check in dependence on the tag-guard control information, and
   wherein the stored page table mappings comprise plural tag-guard control bits for each page table entry specifying tag-check rules dependent on a type of the memory access and the memory access circuitry is responsive to at least one of the plural tag-guard control bits having a predetermined first value to perform the tag-guarded memory access to the addressed location and the memory access circuitry is responsive to the tag-guard control bit having a predetermined second value to perform the non-tag-guarded memory access to the addressed location.

2. The apparatus as claimed in claim 1, wherein the stored page table mappings comprise a tag-guard control bit for each page table entry and the memory access circuitry is responsive to the tag-guard control bit having a predetermined first value to perform the tag-guarded memory access to the addressed location and the memory access circuitry is responsive to the tag-guard control bit having a predetermined second value to perform the non-tag-guarded memory access to the addressed location.

3. The apparatus as claimed in claim 1, wherein the plural tag-guard control bits for each page table entry define tag-check rules arranged to be applied to at least one of:
   data accesses to the addressed location;
   instruction fetches to the addressed location; and
   data accesses made using instructions fetched from the addressed location.

4. The apparatus as claimed in claim 1, wherein the plural tag-guard control bits for each page table entry define tag-check rules which differ for a load operation and for a store operation.

5. The apparatus as claimed in claim 1, wherein the plural tag-guard control bits for each page table entry define a tag-check rule specifying the non-tag-guarded memory access operation for a write access to the addressed location.

6. The apparatus as claimed in claim 1, wherein the apparatus is arranged to set the tag-guard control information in the stored page table mappings in dependence on whether the addressed location is allocated for instruction or data storage.

7. The apparatus as claimed in claim 1, wherein the apparatus is arranged to set the tag-guard control information in the stored page table mappings in dependence on whether the addressed location is allocated as kernel space or as user space.

8. A method comprising:
   performing a translation of virtual addresses into physical addresses in dependence on stored page table mappings between the virtual addresses and the physical addresses, wherein the stored page table mappings comprise tag-guard control information; and
   in dependence on the tag-guard control information, performing one of:
   a tag-guarded memory access in response to a target physical address, the tag-guarded memory access comprising a guard-tag check of comparing an address tag associated with the target physical address with a guard tag stored in association with a block of one or more memory locations comprising an addressed location identified by the target physical address; and a non-tag-guarded memory access to the addressed location without performing the guard-tag check in response to the target physical address, wherein the stored page table mappings comprise plural tag-guard control bits for each page table entry specifying tag-check rules dependent on a type of the memory access, responsive to at least one of the plural tag-guard control bits having a predetermined first value, performing the tag-guarded memory access to the addressed location, and responsive to the tag-guard control bit having a predetermined second value, performing the non-tag-guarded memory access to the addressed location.

9. A non-transitory, computer-readable storage medium storing a computer program for controlling a host data processing apparatus to provide an instruction execution environment for execution of instructions of target program code, comprising:

address translation program logic to perform a translation of virtual addresses into physical addresses in dependence on stored page table mappings between the virtual addresses and the physical addresses, wherein the stored page table mappings comprise tag-guard control information; and memory access program logic to perform a tag-guarded memory access in response to a target physical address, the tag-guarded memory access comprising a guard-tag check of comparing an address tag associated with the target physical address with a guard tag stored in association with a block of one or more memory locations comprising an addressed location identified by the target physical address, wherein the memory access program logic is arranged to perform a non-tag-guarded memory access to the addressed location in response to the target physical address without performing the without performing the guard-tag check in dependence on the tag-guard control information, and wherein the stored page table mappings comprise plural tag-guard control bits for each page table entry specifying tag-check rules dependent on a type of the memory access and the memory access program logic is responsive to at least one of the plural tag-guard control bits having a predetermined first value to perform the tag-guarded memory access to the addressed location and the memory access program logic is responsive to the tag-guard control bit having a predetermined second value to perform the non-tag-guarded memory access to the addressed location.

* * * * *